United States Patent
Gibson et al.

(10) Patent No.: US 10,140,205 B1
(45) Date of Patent: *Nov. 27, 2018

(54) SYSTEMS AND METHODS FOR INFRASTRUCTURE VALIDATION

(71) Applicant: FEDERAL HOME LOAN MORTGAGE CORPORATION, McLean, VA (US)

(72) Inventors: Gregory A. Gibson, Aldie, VA (US); Daniel V. Wood, Warrenton, VA (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/454,317

(22) Filed: Mar. 9, 2017

Related U.S. Application Data

(63) Continuation of application No. 14/021,615, filed on Sep. 9, 2013, now Pat. No. 9,619,370, which is a
(Continued)

(51) Int. Cl.
*G06F 15/16* (2006.01)
*G06F 11/36* (2006.01)
*H04L 29/08* (2006.01)

(52) U.S. Cl.
CPC ...... *G06F 11/3664* (2013.01); *G06F 11/3688* (2013.01); *H04L 29/08072* (2013.01); *H04L 29/08135* (2013.01)

(58) Field of Classification Search
CPC .............. H04L 29/08072; H04L 29/06; H04L 29/08135; G06F 11/3664
See application file for complete search history.

(56) References Cited

U.S. PATENT DOCUMENTS

| 5,303,166 A | 4/1994 | Amalfitano et al. |
| 6,366,957 B1 | 4/2002 | Na |

(Continued)

FOREIGN PATENT DOCUMENTS

JP  2001356912 A  12/2001

OTHER PUBLICATIONS

Full SW Software Validation Facility, pp. 1-2, http://www.astrium.eads.net/corp/prod/00001066.htm. (2004).
(Continued)

*Primary Examiner* — Razu A Miah
(74) *Attorney, Agent, or Firm* — Finnegan, Henderson, Farabow, Garrett & Dunner, LLP

(57) ABSTRACT

Systems and method are provided for testing an infrastructure. The infrastructure may include one or more computers connected by a network. Moreover, each of the computers may include an agent. In one embodiment, the method includes receiving, at a controller, a test request to perform at least one of a plurality of predetermined tests, the predetermined test including one or more parameters associated with performing the predetermined test and one or more expected results from performing the predetermined test. The method further includes determining whether the predetermined test is available at one of the computers. The method also includes sending, by the controller, the predetermined test to one of the computers based on the results of the determining step, such that the agent at the computer performs the predetermined test sent by the controller. Furthermore, the method includes receiving, at the controller, one or more results of the predetermined test performed by the agent at the computer.

15 Claims, 9 Drawing Sheets

Related U.S. Application Data continuation of application No. 12/775,927, filed on May 7, 2010, now Pat. No. 8,583,722, which is a continuation of application No. 11/349,184, filed on Feb. 8, 2006, now Pat. No. 7,743,090.

(56) References Cited

U.S. PATENT DOCUMENTS

| | | | |
|---|---|---|---|
| 6,421,822 B1 | 7/2002 | Pavela | |
| 6,604,092 B1* | 8/2003 | Stewart | G06N 5/04 703/2 |
| 6,668,282 B1 | 12/2003 | Booth, III et al. | |
| 6,891,802 B1 | 5/2005 | Hubbard | |
| 6,940,821 B1 | 9/2005 | Wei et al. | |
| 6,961,778 B2 | 11/2005 | Swartz et al. | |
| 7,016,672 B1 | 3/2006 | Lipsit | |
| 7,127,497 B2 | 10/2006 | Nonaka | |
| 7,224,968 B2 | 5/2007 | Dobson et al. | |
| 7,248,986 B2 | 7/2007 | Klijn et al. | |
| 7,272,614 B2 | 9/2007 | Kraft | |
| 7,386,763 B2 | 6/2008 | Sathe | |
| 8,015,271 B2* | 9/2011 | McKeown | H04L 12/2801 709/223 |
| 2001/0012986 A1* | 8/2001 | Conan | G06F 11/3688 702/188 |
| 2002/0103882 A1* | 8/2002 | Johnston | G09B 7/00 709/218 |
| 2002/0112064 A1 | 8/2002 | Eastvold | |
| 2002/0142365 A1 | 10/2002 | Lifshitz et al. | |
| 2002/0156831 A1 | 10/2002 | Suorsa et al. | |
| 2002/0163882 A1 | 11/2002 | Bornstein et al. | |
| 2002/0191612 A1 | 12/2002 | Curtis | |
| 2003/0074471 A1 | 4/2003 | Anderson et al. | |
| 2003/0078747 A1 | 4/2003 | Sutton | |
| 2003/0126617 A1 | 7/2003 | Tewari et al. | |
| 2003/0191612 A1* | 10/2003 | Chang | G06Q 10/04 703/2 |
| 2003/0200149 A1 | 10/2003 | Gonzalez et al. | |
| 2003/0212938 A1 | 11/2003 | Sutton | |
| 2004/0041827 A1* | 3/2004 | Bischof | G06F 9/45512 715/704 |
| 2004/0073662 A1* | 4/2004 | Falkenthros | H04L 41/5064 709/224 |
| 2004/0098715 A1 | 5/2004 | Aghera et al. | |
| 2004/0107415 A1* | 6/2004 | Melamed | G06F 11/3684 717/124 |
| 2004/0133631 A1 | 7/2004 | Hagen et al. | |
| 2004/0145374 A1* | 7/2004 | Weldin | G01R 31/14 324/536 |
| 2004/0162874 A1 | 8/2004 | Woo et al. | |
| 2004/0203726 A1 | 10/2004 | Wei | |
| 2004/0267485 A1 | 12/2004 | Penov et al. | |
| 2005/0080606 A1 | 4/2005 | Ampunan et al. | |
| 2005/0086498 A1 | 4/2005 | Hulick | |
| 2005/0107976 A1 | 5/2005 | Klijn et al. | |
| 2005/0114500 A1 | 5/2005 | Monk et al. | |
| 2005/0130645 A1 | 6/2005 | Albert Dobson et al. | |
| 2005/0141498 A1* | 6/2005 | Cam Winget | H04L 63/08 370/389 |
| 2005/0240799 A1 | 10/2005 | Manfredi et al. | |
| 2005/0254438 A1* | 11/2005 | Turk | H04L 41/0869 370/254 |
| 2005/0286077 A1 | 12/2005 | Ishibashi et al. | |
| 2006/0025984 A1* | 2/2006 | Papaefstathiou | G06Q 10/06 703/22 |
| 2006/0026670 A1* | 2/2006 | Potter | G06F 21/31 726/7 |
| 2006/0101116 A1 | 5/2006 | Rittman et al. | |
| 2006/0109962 A1 | 5/2006 | Schmidt et al. | |
| 2006/0129992 A1 | 6/2006 | Oberholtzer et al. | |
| 2006/0136785 A1 | 6/2006 | Shu et al. | |
| 2006/0191012 A1 | 8/2006 | Banzhof et al. | |
| 2006/0224705 A1 | 10/2006 | Takase | |
| 2006/0265627 A1 | 11/2006 | Trump et al. | |
| 2006/0287960 A1 | 12/2006 | Marsnik et al. | |
| 2007/0094168 A1 | 4/2007 | Ayala et al. | |
| 2007/0105550 A1* | 5/2007 | Onuma | G06F 17/3089 455/428 |
| 2007/0174422 A1 | 7/2007 | Parkinson | |
| 2007/0254644 A1 | 11/2007 | Dobson et al. | |
| 2008/0120395 A1* | 5/2008 | Smith | H04L 29/06 709/217 |
| 2008/0134018 A1* | 6/2008 | Kembel | G06F 17/30899 715/234 |
| 2008/0189712 A1 | 8/2008 | Boris | |
| 2008/0276126 A1 | 11/2008 | Goldman et al. | |
| 2009/0013072 A1 | 1/2009 | Kato | |
| 2010/0161704 A1* | 6/2010 | Arimilli | H04L 12/40013 709/202 |

OTHER PUBLICATIONS

Software Validation and Tools, pp. 1-2, http://www.ssfi/products/data/attachments/ssf_validation.pdf. (2006).
Technical and Quality Management Portal—Systems—On-board Software Systems, pp. 1-2, http://www.esa.int/techresources/ESTEC-Article-fullArticle_item_selected-33_5_00 par-50_1069167508443.html. (Aug. 2, 2004).
Regression Testing Mercury WinRunner, http://www.mercury.com/us/products/quality-center/functional-testing/winrunner. (Apr. 19, 2005).
Products—Mercury Functional Testing: WinRunner™ How it Works, http://www.mercury.com/us/products/quality-center/functional-testing/winrunner/works.html. (Oct. 4, 2005).
Mercury WinRunner, pp. 1-2, http://www.mercury.com. (© 2004).
Load Testing Software—Automated Performance Testing and Web Testing Software, http://www.mercury.com/us/products/performance-center/loadrunner. (Feb. 6, 2006).
Products—Mercury LoadRunner, an automated load testing tool from Mercury.com works, http://www.mercury.com/us/products/performance-center/loadrunner/works.html. (Jun. 14, 2004).
Mercury Loadrunner, pp. 1-2, http://www.mercury.com. (© 2005).
IBM Software—Rational Robot—Product Overview, http://www-306.ibm.com/software/awdtools/tester/robot. (2003).
IBM Software—Rational Robot—Features and benefits, http://www-306.ibm.com/software/awdtools/tester/robot/features/index.html. (2004).
IBM Software—Rational Performance Tester—Product Overview, pp. 1-2, http://www-306.ibm.com/software/awdtools/tester/performance/index.html. (2004).
IBM Software—Rational Performance Tester—Features and benefits, pp. 1-3, http://www-306.ibm.com/software/awdtools/tester/performance/features/index.html. (2004).
IBM® Rational® Performance Tester, pp. 1-4, http://www-306.ibm.com. (© 2005).
IBM Rational System Testing Family, Test smarter, finish faster, pp. 1-4, http://www-306.ibm.com. (© 2004).

* cited by examiner

SYSTEMS AND METHODS FOR INFRASTRUCTURE VALIDATION

CROSS REFERENCES TO RELATED APPLICATIONS

This application is a continuation of U.S. patent application Ser. No. 14/021,615, filed Sep. 9, 2013, which is a continuation of U.S. patent application Ser. No. 12/775,927, filed May 7, 2010 (issued as U.S. Pat. No. 8,583,722), which is a continuation of U.S. patent application Ser. No. 11/349,184, filed Feb. 8, 2006 (issued as U.S. Pat. No. 7,743,090). The content of each of the above-referenced applications is expressly incorporated herein by reference to its entirety.

BACKGROUND

I. Technical Field

The present invention relates to data processing and, more particularly, systems and methods for testing an infrastructure.

II. Background

There is, and will continue to be, advances and changes in how enterprises conduct business. Whether these advances and changes occur through growing competition, globalization, mergers, acquisition, or a restructure of business processes, a key to success will be how quickly the enterprise's information technology (IT) organization can adapt to evolving business needs. Adapting to these needs presents challenges to the business enterprise.

One such challenge is the development and deployment of software applications used in connection with the business enterprise. These business applications are often developed and deployed by the business enterprise to support operations, improve internal and external business processes, and to allow customers and suppliers to conduct business with the business enterprise. The business applications may interact with hardware and software distributed across an intranet and the Internet. As such, the infrastructure (or framework) associated with a business application may include hardware and software across an intranet or the Internet. When developing a business application, the infrastructure of the business application should be tested before installation of the business application to facilitate timely and reliable deployment of the application. By way of example, a purchasing application at a computer may require access through the Internet to another computer hosting a database application for providing price information. The same purchasing application may also require access through an intranet to another computer hosting an internal accounting database application and other internal applications. The infrastructure of the purchasing application may thus include the hardware and software associated with the purchasing application as well as other applications. For example, the infrastructure may include computers, their operating systems, and the networks connecting the computers, network devices (e.g., routers, firewalls, and the like), web servers, and database applications. In this example, although development of the purchasing application is complex, testing of the infrastructure of the purchasing application is also complex since it may require testing numerous disparate applications, databases, network connections, and the like, some of which may not be under the control of the business enterprise. Moreover, the testing of the infrastructure associated with the application is often unique to the application and performed manually—making it prone to error and time consuming. Furthermore, once infrastructure testing of the application is complete, another application may also require infrastructure testing—prompting additional manual testing unique to the other application. There is thus a need to improve testing of an infrastructure associated with an application, such as a business application, being developed and deployed.

SUMMARY

The present invention provides systems and methods, including computer program products, for testing an infrastructure.

In one embodiment, there is provided a method for testing an infrastructure. The infrastructure may include one or more computers connected by a network. Moreover, each of the computers may include an agent. In one embodiment, the method includes receiving, at a controller, a test request to perform at least one of a plurality of predetermined tests, the predetermined test including one or more parameters associated with performing the predetermined test and one or more expected results from performing the predetermined test; determining whether the predetermined test is available at one of the computers; sending, by the controller, the predetermined test to one of the computers based on the results of the determining step, such that the agent at the computer performs the predetermined test sent by the controller; and receiving, at the controller, one or more results of the predetermined test performed by the agent at the computer.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. The implementations in the following description do not represent all implementations consistent with the claimed invention. Instead, they are merely examples. Wherever possible, the same reference numbers throughout the drawings refer to the same or like parts.

Figure 1:
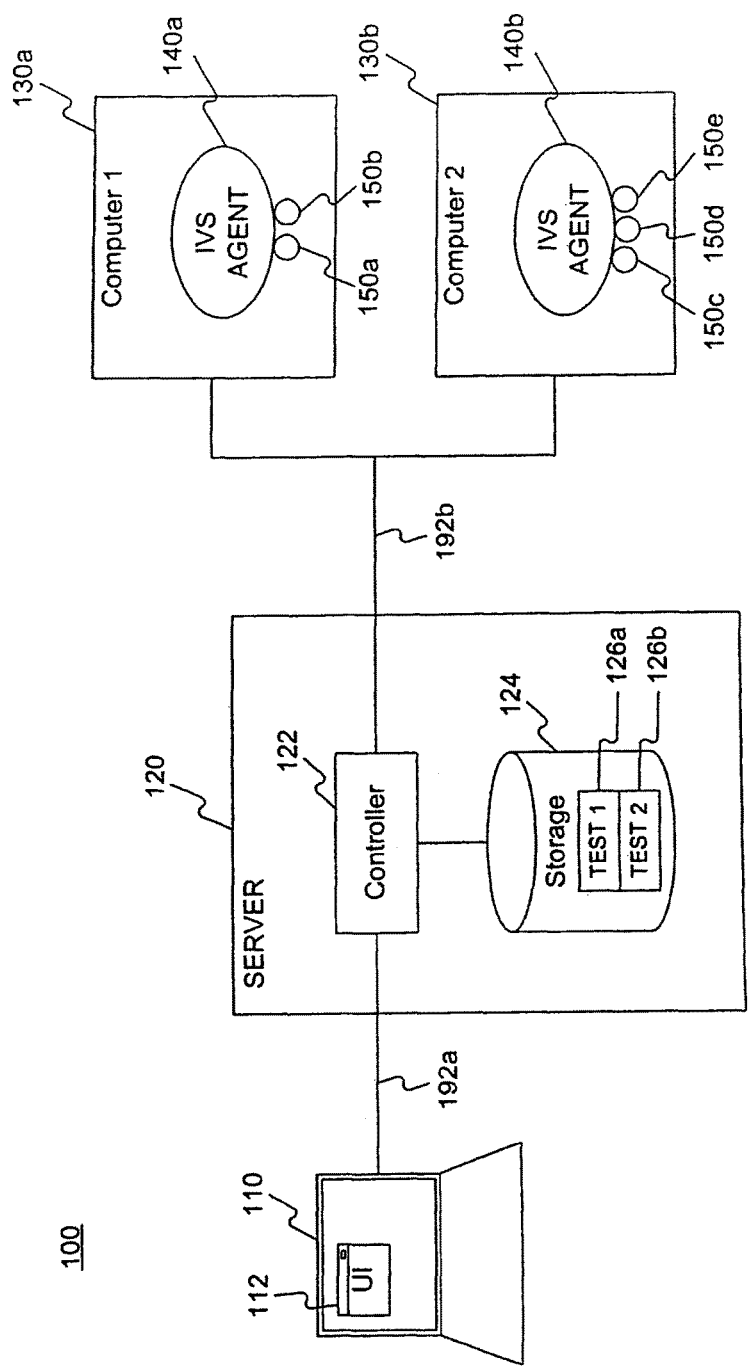
FIG. 1 illustrates a block diagram of an exemplary system environment consistent with certain aspects related to the present invention.

FIG. 1 is a block diagram of an exemplary system 100 for testing an infrastructure. The framework (also referred to as an infrastructure) associated with system 100 includes a client system 110, a server system 120, one or more computers 130a-b, and one or more agents 140a-b. Client system 110 includes a user interface 112, allowing a user at user interface 112 to interact with a controller 122 at server 120. The controller 122 may control agents 140a-b, which perform testing of the infrastructure. When a user creates a new, or selects an existing, test request that includes one or more tests stored at a storage device 124, the test request including the tests may be sent to controller 122. Controller 122 may then send one of the tests of the test request to agent 140a. Agent 140a may perform the received test and send the results to controller 122. Controller 122 may send the test results to user interface 112 for display to a user. The test results may be used to validate the infrastructure associated with a business application before the business application is installed.

Figure 2:
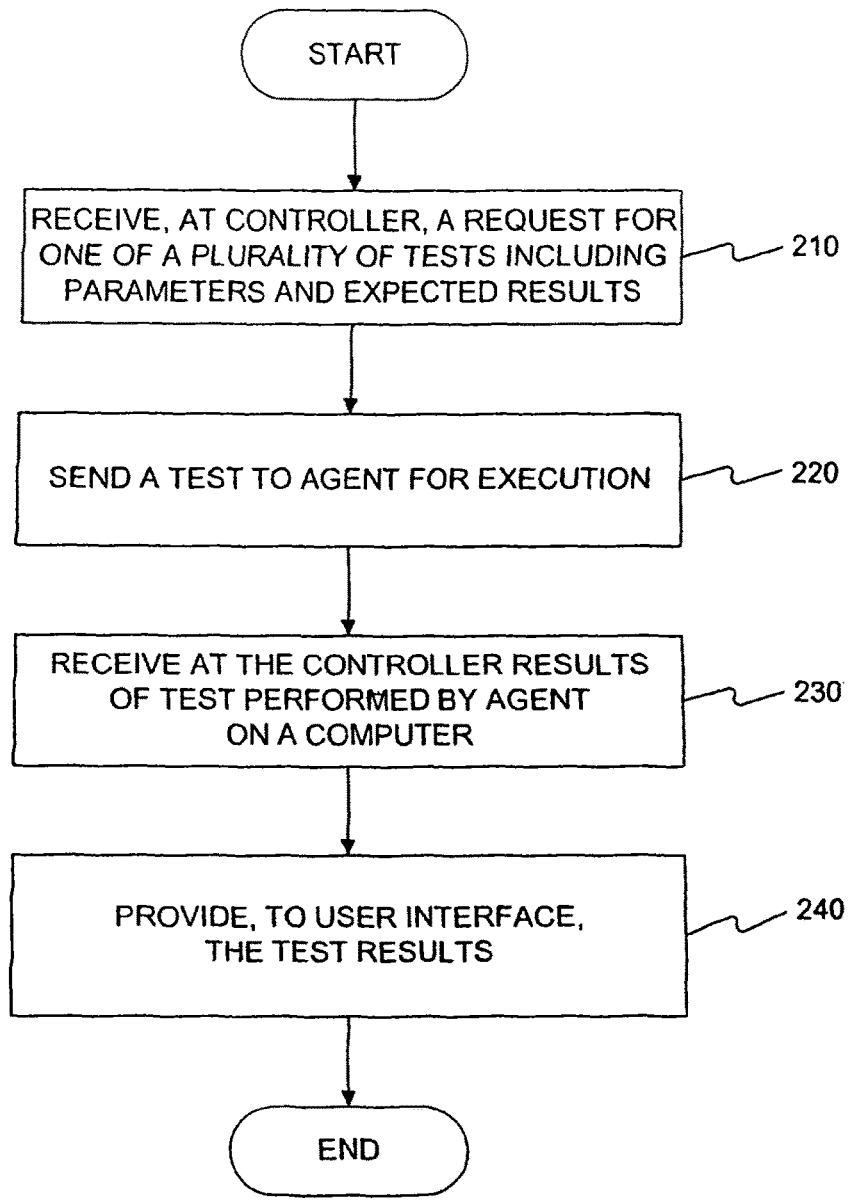
FIG. 2 illustrates a flowchart of an exemplary operation of the present invention consistent with certain aspects related to the present invention.

FIG. 2 depicts a flowchart with steps for performing infrastructure validation using agents. Referring to FIGS. 1 and 2, user interface 112 may allow a user to interact with a controller 122 to request one or more test requests. The test requests may include one or more tests, parameters for each of the tests, and expected results for the tests. Moreover, the test requests may be stored at storage device 124. When controller 122 receives the test request selected by a user at user interface 112, controller 122 sends at least one of the tests of the test request to at least one of the agents 140a-b for execution (steps 210-220).

In some embodiments, controller 122 may first determine which tests are available at an agent before sending a test to an agent. For example, controller 122 may contact each agent requesting a list of the tests available for execution on that particular agent machine. Tests are organized into related sets referred to as test components. A test component may be implemented as an "object" for distributing tests to agents and for presenting available tests to users. An "object" means a bundle of variables (e.g., data) and related methods accessed by software. In object-oriented programming, an object is a concrete realization (instance) of a class that consists of data and the operations associated with that data. The schema that lists tests may be implemented as a user defined list of tests and agents capable of performing those tests. For example, an agent implemented in software as an object at a computer may be used to test a database at the computer. In this example, the schema may indicate that the agent can perform one or more of the following tests (or test components): login to the database; perform a scripted query of the database; perform a scripted update of the database; and perform a scripted retrieve from a table within the database.

When the test is sent to an agent for execution, the agent, such as agent 140a, may call a test component (e.g., test component 150a) to execute the test. Next, test component 150a may provide the test results to agent 140a. Controller 122 may then receive from agent 140a the actual test results, and provide the actual test results to user interface 112 for display (steps 230-240).

Figure 3:
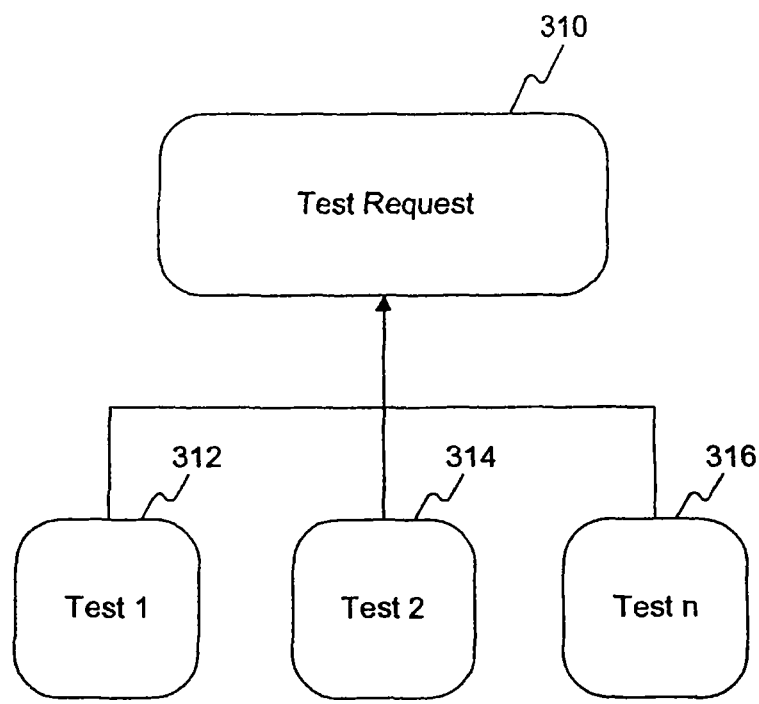
FIG. 3 illustrates an exemplary test request including a plurality of tests consistent with certain aspects related to the present invention.

FIG. 3 depicts an example test request 310 including three tests 312-316. A test request may serve as a container for one or more tests. Moreover, a user at user interface 112 may create and store (at storage 124) one or more test requests and corresponding tests. The stored test requests may be retrieved for later use when testing the infrastructure associated with a business application. Tests 312-316 may be predetermined by a user, such as a technician, and stored in storage 124. Moreover, each of the tests 312-316 may include parameters for controlling the execution of the test and expected results for comparison to any actual results from performing each of the tests. The parameters may serve to customize a test. For example, a test 312 may validate that an agent can login to a server. In this example, the parameters would include an address of the server, a login identification, and a password. The expected results in this example would include an indication that the login was successful, such as a reply from the server.

Although FIG. 3 depicts test 312-316 as running in parallel, tests 312-316 may instead run in a serial manner. Moreover, there may be some dependency between tests. For example, a first test 312 may test whether an agent can login to a server, while a subsequent, second test may test an application at the server. The second test, however, may be dependent on the outcome of the first test. Specifically, if the first test fails (e.g., a failed login to the server), then the second test would not be performed. Moreover, stopping the test after a failed test may provide insight into the source of a possible problem. Returning to the previous example, a failure by the first test may indicate a problem with the server or its login.

Moreover, tests 312-316 may also include an indication of which agents 140a-b are capable of performing a test. For example, when agent 140a is hosted on computer 130a configured with Windows™, a test, such as a Windows login test of computer 130a, could be associated with agent 140a. Moreover, the test may include an indication that the Windows login test is capable of being performed at computer 130. Other examples of tests 312-316 include the following: an HTTP GET test for testing whether an hyper text transfer protocol (http) connection may be established from a particular computer to a server on the Internet or an intranet; a ping test for testing whether a computer connected to network 190 responds to a ping command; a TCP Settings test for testing the value of one or more TCP configuration parameters (e.g., tcp_time_wait_interval, tcp_conn_req_max_q); a test of the NTP (Network Time Protocol) to determine whether network time is available on a computer; a login test to determine whether an agent can login to another computer or application; a firewall test to determine whether an agent at a computer can send and receive packets through a firewall; a software test to identify the software versions installed on a computer; a kernel module test to identify currently loaded operating system kernel modules; a patch test to identify currently installed patches; an inter-process communication setting test to identify shared memory and semaphore settings; a database login test to validate that a user or business application can login to a database from a particular computer; and any other test appropriate for testing the infrastructure. The test request may thus allow the aggregation of tests for different computers and their corresponding software.

Tests 312-316 may be predetermined and stored at storage device 124. For example, a user may define each of the tests with appropriate parameter values and expected result values, and store them for later use. Moreover, the actual results from performing tests may be stored as well. Storing actual test results enables controller 122 to compare actual results from different tests to identify differences and possible anomalies.

Moreover, by providing persistence of tests 312-316, other users can utilize the stored tests or utilize the stored tests as templates to configure other tests. For example, before deploying a new application that interacts with other computers, applications (e.g., database applications), and networks, a pre-existing test request and corresponding tests may be used as a template to develop other test requests and tests specific to the new business application. Moreover, tests may be selected from stored tests to configure a customized test sequence of one or more tests. The customized test sequence (also referred to as a test script) may enable testing of an application either before, during, or after its deployment on the infrastructure, which may eliminate the need to develop or purchase a commercial-off-the-shelf test tool useable only with the application under test.

The test script may also be stored and reused for additional testing. The results of additional testing may provide test data that can be compared with previous baseline tests. Such comparative testing may provide additional information regarding the performance of the application.

When a business application is being developed, any testing of its infrastructure may be performed independently of the business application. Specifically, while the business application is being developed, any infrastructure components of system 100 that will be needed to accommodate the business application would be tested beforehand using controller 122 and agents 140a-b. For example, access to a database server at a remote network would be tested before installation of the business application, validating a part of the infrastructure (e.g., access to the database) without requiring the actual business application at system 100. Controller 122 and agents 140a-b may thus provide testing of an infrastructure independent of the business application for which the testing is performed.

Although testing of an infrastructure is described above as occurring before a business application is deployed, testing can be performed at anytime. For example, whenever a change is made to a business application or a change is made to the infrastructure (e.g., a new or updated operating system is added or a new or updated database is added), the infrastructure may be tested. The actual results of testing may be compared to previous actual test results. Moreover, infrastructure testing may be used to determine whether or not a problem being encountered by a particular business application is being caused by an infrastructure component (e.g., network, operating system, a specific application). For example, by testing the infrastructure independent of the business application, the infrastructure may be ruled out as a possible source of the problem when infrastructure testing is successful.

When sending or receiving test request 310 and tests 312-316 within system 100, the structure depicted in FIG. 3 may serve as a message format for such sending or receiving.

Figure 4:
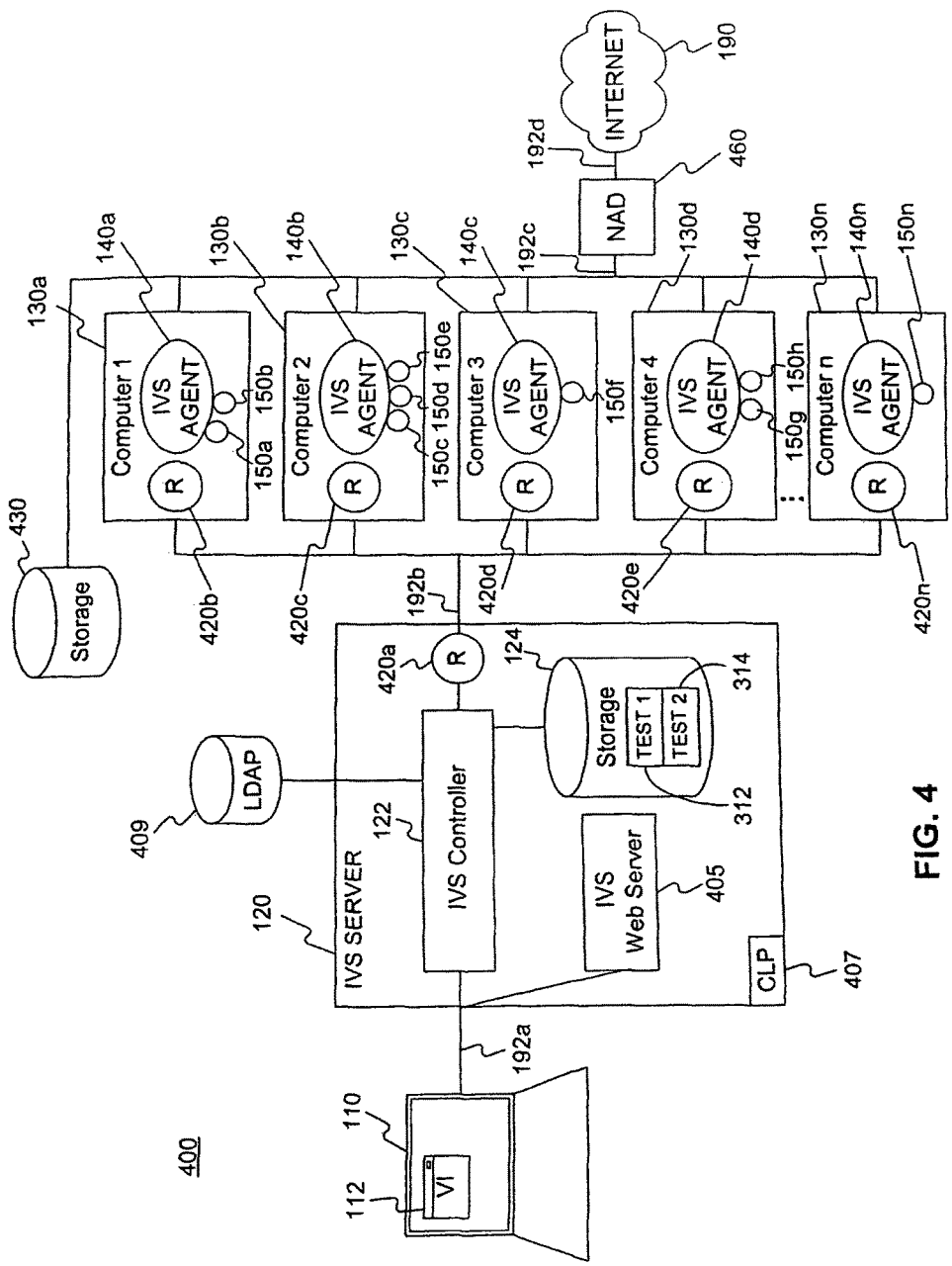
FIG. 4 illustrates a block diagram of another exemplary system environment consistent with certain aspects related to the present invention.

FIG. 4 depicts another exemplary system 400 for performing validation of an infrastructure. System 400 is similar to system 100, but includes additional features not expressly depicted in FIG. 1. Controller 122 may actively control testing of the infrastructure 400 depicted in FIG. 4 by sending tests to agents 140a-n, so that the agents 140a-n perform the tests using test components 150a-n.

Client 110 may include one or more processors, such as computers, to interface with server system 120. Client system 110 includes user interface 112 for interacting with controller 122 at server 120. Client system 110 connects to server system 120 through network connection 192a. Although FIG. 4 shows a single client system 110 and a single server system 120, a plurality of client systems and server systems may be used. Moreover, although FIG. 4 is described with respect to a client-server architecture, system 400 can use any other appropriate architecture.

User interface 112 may provide an interface to allow a user to interact with controller 122 or agents 140a-n. User interface 112 may include a browser to facilitate interaction with controller 122. In some embodiments, user interface 112 may be implemented using a Java™ Swing application that is deployed using Java™ WebStart. Java™ software (including Swing and WebStart) is commercially available from Sun Microsystems, Santa Clara, Calif. As with other graphical user interface toolkits, Swing includes toolkit items, such as text boxes, buttons, split-panes, and tables. The Swing toolkit items allow a developer to develop a user interface, such as user interface 112. The Java™ WebStart environment may be used to manage the configuration and installation of user interface 112 once it is downloaded for installation from a web server 405. Although Swing and WebStart are described, other toolkits and environments may be used.

User Interface 112 may communicate with controller 122 through network connection 192a. Moreover, user interface 112 may call controller 122 using protocols, such as a Remote Procedure Call (RPC) or a Simple Object Access Protocol (SOAP). In one embodiment, a Java Remote Method Invocation (RMI) is used by user interface 112 to call controller 122, although other protocols may be used.

When Remote Method Invocation is used at user interface 112, a registry 420a-n may provide a naming service allowing discovery of registered components. For example, when using Remote Method Invocation, each of user interface 112, controller 122, agents 140a-n, and test components 150a-n may each register with a registry, such as registry 420a-n. Agent 140a may register at registry 420b, which may share the registry information with registry 420a to allow controller 122 to discover agent 140a.

Network connections 192a-d and network 190 may each include, alone or in any suitable combination, a telephony-based network, a local area network (LAN), a wide area network (WAN), a dedicated intranet, wireless LAN, the Internet, an intranet, a wireless network, a bus, or any other any communication mechanisms. Further, any suitable combination of wired and/or wireless components and systems may be used to provide a communication mechanism in network connections 192a-d and network 190. Moreover, network connections 192a-d and network 190 may be embodied using bi-directional or unidirectional communication links. Network connections 192a-d and network 190 may also implement web-based protocols, such as Transmission Control Protocol/Internet Protocol (TCP/IP), Hyper Text Transfer Protocol (HTTP), SOAP, RPC, RMI, and the like.

Server system 120 may include one or more processors, such as computers, to interface with other computers, such as client system 110 and agents 140a-n including their corresponding computers 130a-n. In addition to the components described above with respect to FIG. 1, server 120 may include server 405 and a command line processor component 407. Server 405 may allow software for a user interface, such as user interface 112, to be downloaded to a computer, such as client 110. Command line processor 407 may allow commands to be sent directly to controller 122 to bypass user interface 112.

Controller 122 may control testing performed during validation of infrastructure 400. To control testing, controller 122 may control one or more agents 140a-n at computers 130a-n, so that the agents can perform predetermined tests included within a test request. When a test request is received at controller 122, controller 122 may authenticate the user requesting the execution of the test request. Each test request (or tests contained therein) may include information indicating which user (or type of users) is authorized to perform testing. For example, controller 122 may query an LDAP (Lightweight Directory Access Protocol) server 409 to determine the user type (e.g., administrator user or normal user). Based on the results of the query, controller 122 may authorize testing. Alternatively, controller 122 may send user information to agents 140a-n, so that the agents can determine whether the user is authorized to perform a test at an agent.

When controller 122 receives from user interface 112 a test request, controller 122 may determine which agents can execute the tests included within the test request. Controller 122 may determine which tests an agent can perform based on a list of agents and corresponding tests available at each of those agents. Moreover, the tests available at an agent (e.g., the test components at an agent) may be unique to the computer hosting the agent. For example, the test components may be specific to the following: operating system type at the computer hosting the agent (e.g., Windows™, Solaris™, Linux, AIX, and the like); and applications configured on the computer hosting the agent (e.g., whether the computer includes a WebLogic 8.1 server, a WebMethods 6.1 server, Apache 2.2 server, UDB 7.2 (Universal Database), and the like). The list of agents and available tests may be stored at storage device 124.

When an agent is first called, the agent may first determine which test components are available and installed at the agent. To discover the test components at an agent, the agent may determine which tests components should be installed based on a stored list of tests. Alternatively, the agent may determine which test components are installed based information stored at registry 420a-n or storage device 124. Next, the agent may call each installed test component to determine whether the test component is indeed testable on the computer hosting the agent. The called test component may then perform one or more self-tests (e.g., check the operating system, installed software, and the like) to determine whether it is available for test on the computer hosting the agent.

If the test component is available for test on the computer, the test component may build a description of itself and include the description within an object (referred to as a test component object). For example, a test component 150d may contain a group of tests for the Solaris operating system. One of these tests may test the login at a computer with a Solaris™ operating system. After a self-check, test component 150d may build a description of itself, such as "SolarisTests." If the login test is testable, test component may build a description of the login test, such as "LoginTest." If the test component is testable, agent 140b adds test component 150d, the description of the test component 150d (e.g., "SolarisTests"), and the descriptions of the tests (e.g. "LoginTest") belonging to that test component to a list of test components available at agent 140b. The list may be stored at server 120 (e.g., storage 124), client 110, computers 130a-n, or at any other appropriate location. Furthermore, agents 140a-n may reload the set of test components without restarting the agents.

Storage device 124 may be any type of storage medium including, for example, a hard drive, an optical drive, flash memory, or any other computer readable storage medium. Storage device 124 may store information used when testing the infrastructure associated with system 400 including test requests, tests, parameters, expected test results, actual test results, and user preferences. For example, FIG. 4 depicts tests 312 and 314 stored at storage device 124.

In one embodiment, to send a test to an agent, controller 122 may initiate a call (e.g., an RMI call or an RPC call) to an agent 140a-n. The call may instantiate the agent as an object. When each of agents 140a-n is instantiated, agents 140a-n may register with registry 420a-n. Moreover, agents 140a-n may determine, based on a list of stored tests, the test components available 150a-n at each of the agents 140a-n. If a stored list is not available, an agent may discover which tests are available, as described above. FIG. 4 depicts agent 140a as having two test components 150a-b. The two test components 150a-b may be specific to agent 140a or the infrastructure associated with computer 130a. For example, agent 140a may include test components 150a-b that are specific to computer 130a including its hardware and software, such as the operating system (e.g., Sun Solaris 9), and the applications (e.g., WebLogic, Apache, UDB) installed on or accessible by computer 130a.

Computers 130a-n may be implemented as processors capable of being configured with agents 140a-n. Agents 140a-n each provide a mechanism for performing one or more tests and providing a corresponding test result. When instantiated, agents 140a-n may each instantiate a test component, which can be called upon to perform one or more tests. The instantiated test component may return any test results to the agent that called the test component. The agent may also gather results from a plurality of test components and send the results to controller 122. Controller 122 then sends the results to user interface 112.

Network access device 460 (labeled NAD) provides access to a network or connection. Network access device 460 may include one or more of the following: a router, a firewall, a modem, a NIC (network interface card), and any other device used when providing access to a connection or network, such as the Internet or an intranet. When a test requires access to another network, device 460 may be used. For example, if a ping command is required to validate a connection to a server external to system 400, the ping command may go through network device 460 and network 190. As such, infrastructure testing may include validating that the connection may be established through network device 460.

Figure 5:
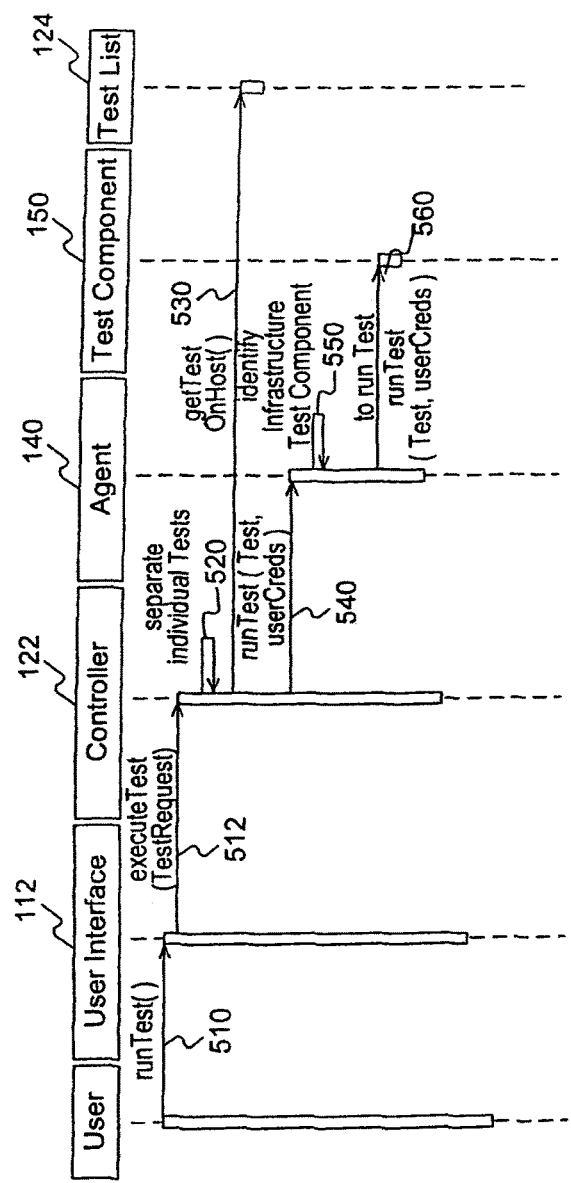
FIG. 5 illustrates a sequence diagram for performing a test at a computer having an agent consistent with certain aspects related to the present invention.

FIG. 5 depicts a sequence of steps associated with executing a test request. Referring to FIG. 5, a user may login to user interface 112 and then retrieve test requests (and user preferences) from storage 124. To run a test request 310, the user through user interface 112 selects one of the stored test requests (step 510). User interface 112 makes a call to controller 122 to execute the selected test request (step 512). Controller 122 then executes the test request 310 by identifying the individual tests 312-316 included within the test request and then separating the predetermined tests 312-316 (step 520).

For each test 312-316, controller 122 sends the tests to agents on the computers. The computers may be selected for test by a user through user interface 112. The agent on the requested computer will validate that the test component on the computer can perform the requested test (step 530). For example, controller 122 may send a test to an agent on a computer. The agent may then determine whether or not the requested test component and test are available based on a list of available test component descriptions and/or test descriptions. The agent may be hosted on a computer with a Sun-based operating system, such as Solaris 9. The agent may include a Solaris 9 test component in its list of available test components. The Solaris 9 test component may serve as a container for tests at the computer configured with Solaris 9. The Solaris 9 test component may be configured to include a version check of the Solaris 9 operating system, a check of patches installed on the Solaris 9 operating system, a check of other applications installed on the computer. Furthermore, the agent may include a Network test component in its list of available test components. The Network test component may include a ping, a trace route, and a check of the network configuration (e.g., ipconfig for Windows machines, ifconfig for Solaris machines). A test component may thus be configured to only include tests specific to a computer and/or its operating system. In addition, the test component may include tests that are unaffected by the specific computer and/or operating system. An example of one such unaffected test is the ping command.

Based on the results of step 530, controller 122 then sends each test 312-316 to an agent capable of performing the test (step 540). When a test (e.g., test 312) is received at an agent (e.g., agent 140a), agent 140a identifies which test component is associated with the requested test (step 550). Agent 140a then performs the test by calling the identified test component (step 560). To identify which test component can perform the test, agent 140a may determine which of the test components 150a-b can be called to perform the test based on stored descriptions of the test components. The called test component (e.g., test component 150a) may then execute the test (e.g., test 312) using the parameters and expected results included within test 312. For example, if test component 150a tests access to a database, test 312 may include as parameters the location of the database (e.g., an Internet Protocol address of the database) and login credentials (e.g., a login name and password). The expected results may include a reply from the database.

Any actual results from testing may be included as a field of an object instantiated as an "actual" results object. Test component 150a may then return the actual results object to agent 140a. Agent 140a may then return the actual results object to controller 122. Controller 122 may then return the actual results object to user interface 112 for display. When multiple tests are included in the test request, controller 122 may consolidate actual results and then send them as a group to user interface 112. Moreover, the actual results may be stored in storage 124 for later use. The actual results may be associated with the original test 312 when the actual results are sent from test component 150a, agent 140a, and controller 122 to user interface 112.

Figure 6A:
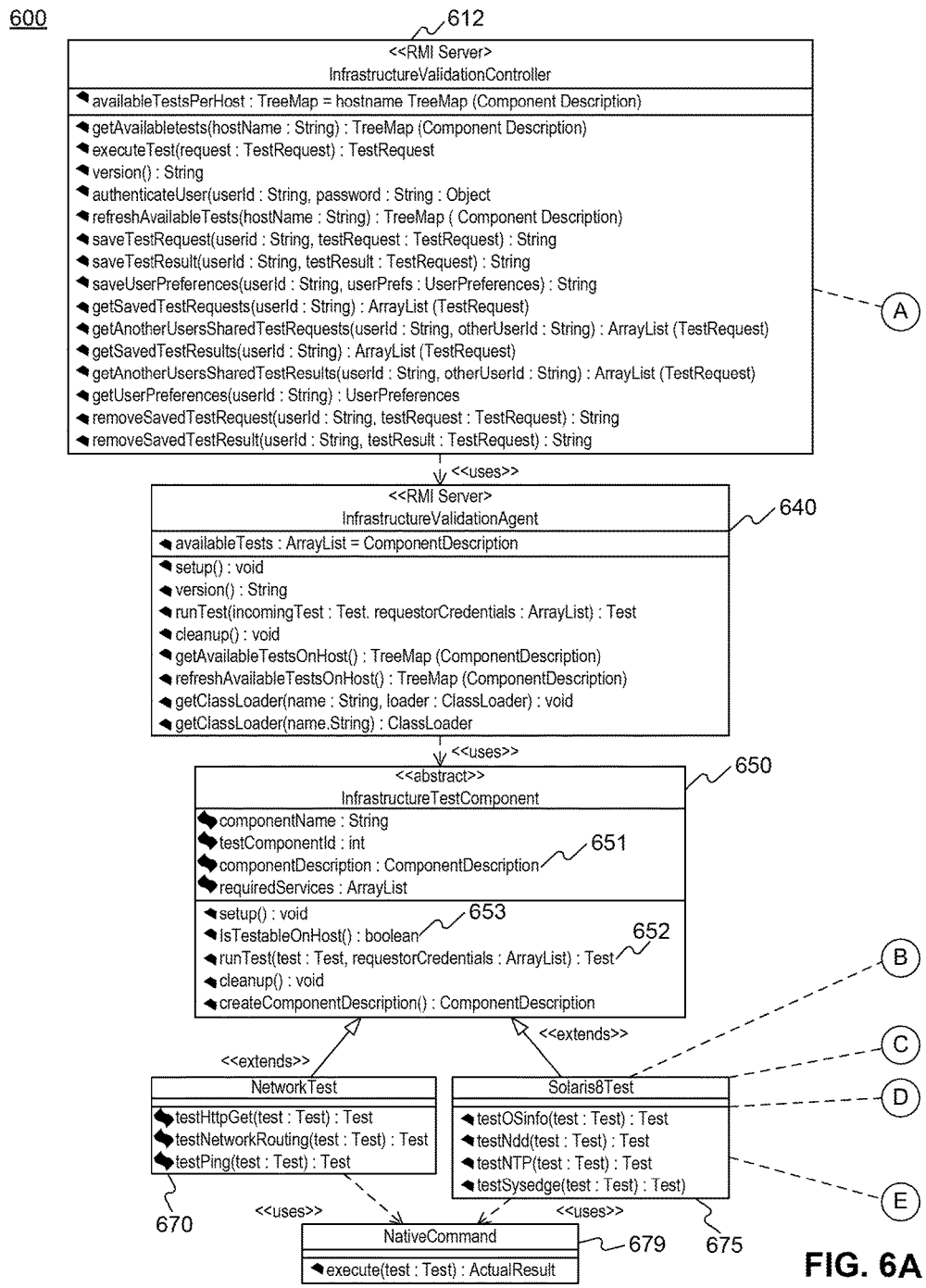
FIG. 6 illustrates objects consistent with certain aspects related to the present invention.
Figure 6B:
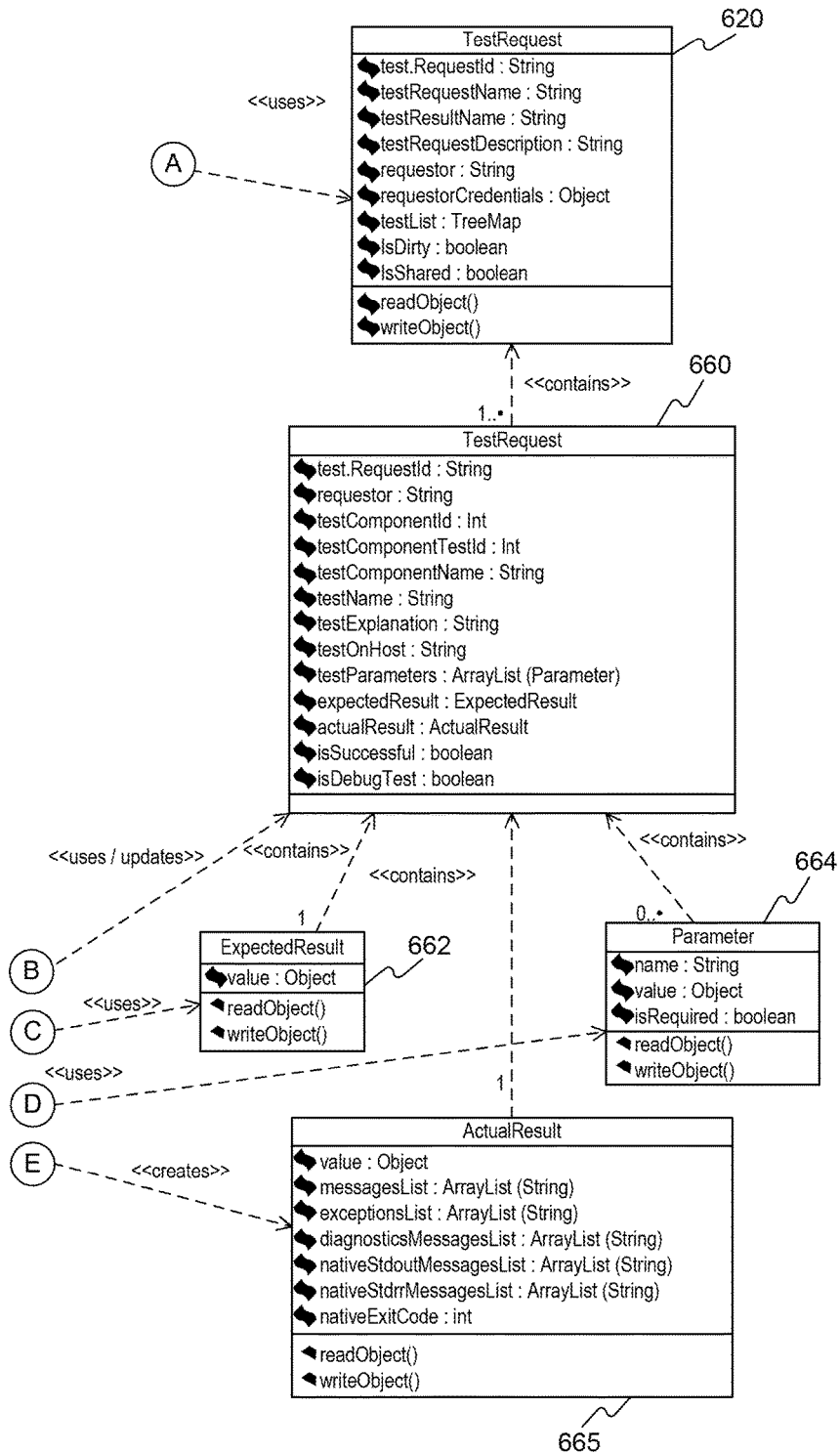

FIG. 6 depicts a schema 600. Schema 600 is an organization or structure, such as the organization of a database or the structure of an object in an object oriented program. In object oriented programming, modeling (i.e., the analysis of objects and the identification of the relationships among these data objects) leads to schema 600, which can be stored in storage device 124. The schema can be depicted visually as a structure, as in FIG. 6, or a formal text-oriented description (e.g., script).

When controller 122 is implemented as an object, controller 122 is modeled as controller object 612, which contains a list of all available tests per agent, and methods, such as methods for communicating with the user interface 112. When agent 140 is implemented as an object, agent 140 is modeled as agent object 640, which contains a list of all available tests for that instance of the agent, and methods, such as methods for running tests. When agent 640 instantiates a test component, it is modeled as test component object 650. Test component object 650 includes a component description 651 and a method 653 to determine whether the test component object is testable on agent 640. Moreover, test component object 650 can run one or more tests 652, which are also objects having the form of test object 660. Test component object 650 may be extended to include a network test object 670 containing all of the predetermined network tests or a Solaris 8 test object 675 containing all of the predetermined Solaris 8 tests, both of which use the native command object 679 to enable the execution of commands at the operating system level.

When test request 310 is implemented as an object, test request 310 is modeled as test request object 620. When tests 312-16 are implemented as objects, tests 312-316 are each modeled as test objects, such as test object 660. FIG. 6 further depicts an example of the object-oriented structure of test request 620 and test object 660. Moreover, test object 660 may include expected results 662 and parameters 664 as well as actual results 665. In one embodiment, the objects 612-679 are used during the calls between components of system 400.

In one embodiment, after login by a user, system 400 may retrieve from storage device 124 any saved test requests. Moreover, when a user provides a computer name and requests a list of available tests for the computer (or the agents therein), system 400 provides a list of available tests (or test components) for the computer. The list of test components may be stored at user interface 112, at server 120, or other accessible location. For example, a list of available test components may include: (1) agent 140a having test components 150a-b; and (2) agent 140b having test components 150c-e. If the list is not available at user interface 112 or server 120, controller 122 may call an agent to see if that agent has a list of available test components at that agent. If the agent does not have a list of available test components, the agent may discover all its installed test components by querying each of the test components to determine test component availability. For example, if a test component were available, the test component would be called by an agent and would create a test component description. The test component description may be included in a list of available test components.

In one embodiment, a user through user interface 112 may create a test request. For example, a user may login to user interface 112 and then request through user interface 112 that a new test request be created. User interface 112 may then prompt the user for a test request name. After receiving the name, user interface 112 may validate that the name is not already in use (e.g., a duplicate of a previously used name stored at storage 124). If not a duplicate, system 400 may create a test request with the name provided by the user.

The user may then add tests to the created test request. For example, a user through user interface 112 may list any available test components for a computer (or its agent), and select a test within an available test component. The user may also provide parameter values using parameter descriptions associated with the selected test. Through user interface 112, the user may add the test to the test request. User interface 112 may also validate that all required information (e.g., parameters and expected results) for the test has been provided.

Test requests and tests may be deleted and renamed. Moreover, test requests and tests may also serve as clones (or templates) for other tests—saving time when developing new test requests and tests.

Figure 7:
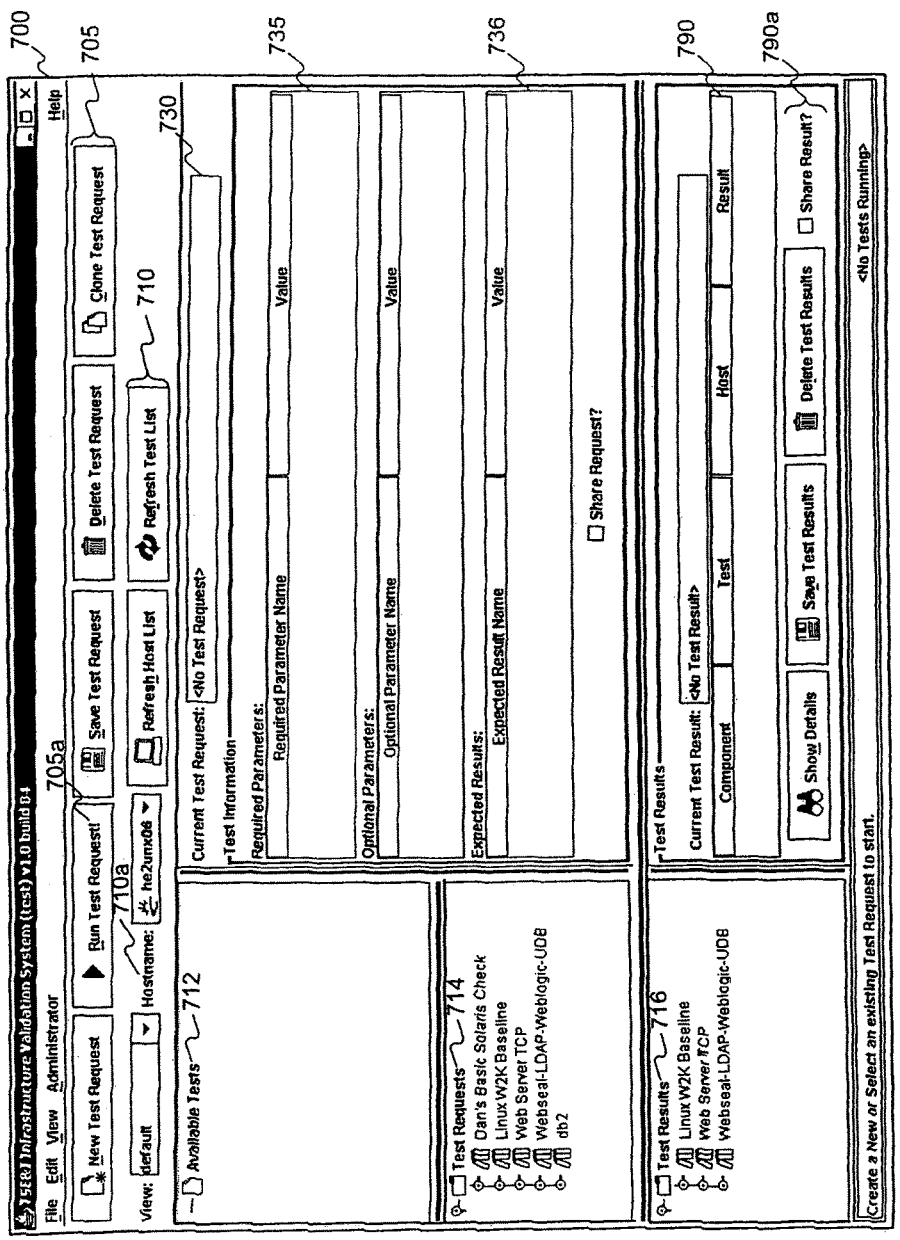
FIG. 7 depicts a user interface consistent with certain aspects related to the present invention.

FIG. 7 depicts an exemplary user interface 700. A user may view tests 712 available at system 400 by selecting one of the names 710a of the computers 130a-n. The available tests 712 may correspond to a list of test components and corresponding tests available at an agent of a computer. Examples of available test components include the Solaris 8 test component and Network test component, both of which are described above. User interface 700 may also display test requests 714 and test results 716, both of which are stored at storage device 124. The control pane 705 may be used to run, save, delete, or clone a test request.

A user can select a test request 714 and click run 705a to send the available test to controller 122. When a test 712 is selected, the corresponding test request(s), parameters, and expected results are displayed at panes 730, 735, and 736, while the actual results are displayed at pane 790. For example, the Network test component may include a hostname resolution test for resolving an input host name to its corresponding IP address. The hostname resolution test would include parameters, such as the host name to be resolved, an expected result for the IP address, and an actual result. User interface 700 allows the test results to be shown, saved, deleted, or shared with other users using the button at control pane 790a.

Figure 8:
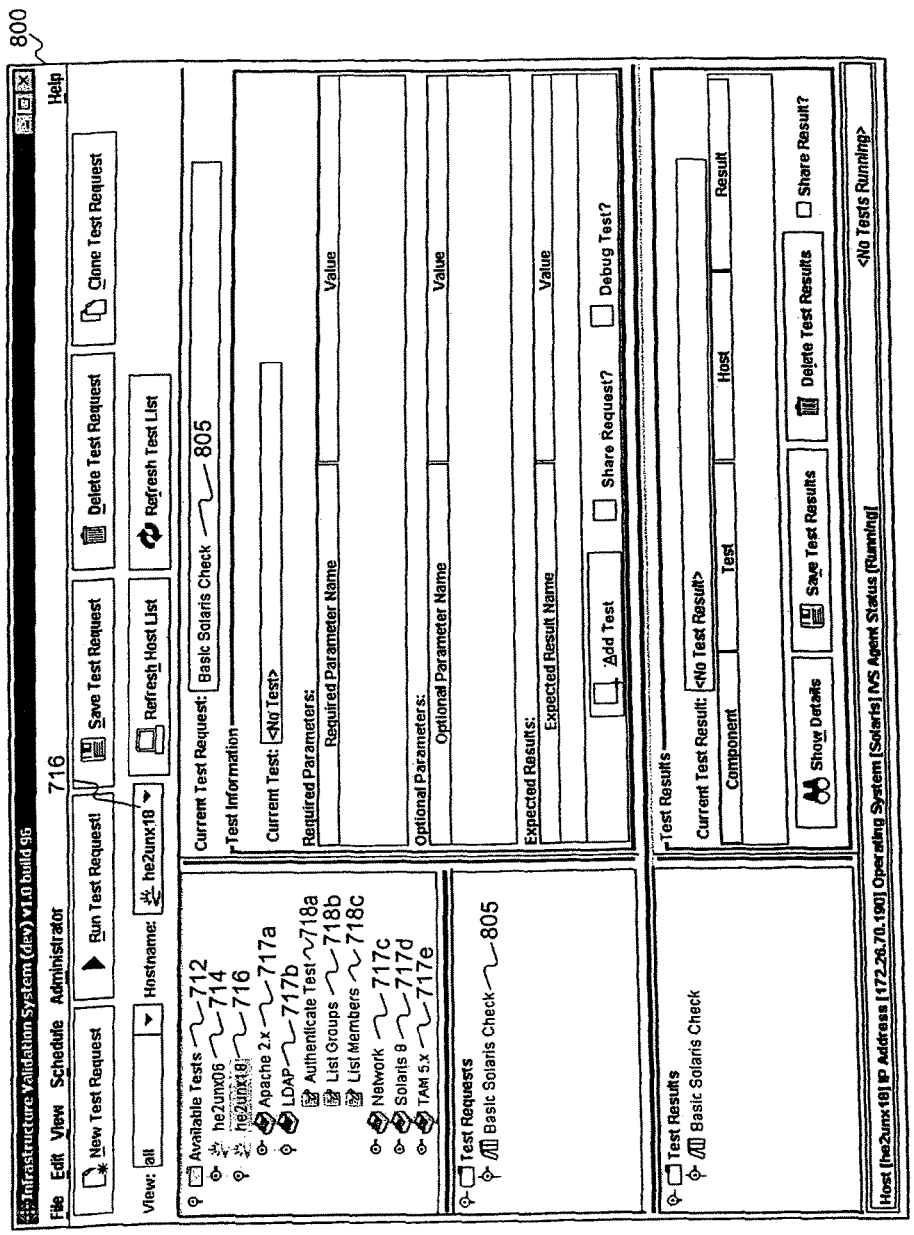
FIG. 8 depicts another user interface consistent with certain aspects related to the present invention.

FIG. 8 depicts another exemplary user interface 800. A user may view available tests 712. Available tests 712 list each computer (or host) which can be tested. Specifically, computers 714 and 716 are listed. User interface 800 depicts that a user has selected host 716. When host 716 is selected, test components 717a-e are displayed. User interface 800 also depicts that a user has selected an LDAP test component 717b. The LDAP test component 717b includes tests, such as authenticate test 718a for testing the authentication to an LDAP server; list group 718b for testing the whether a user is a member of an LDAP group; and list members 718c for testing the membership of an LDAP group.

When a user selects the test request named "Basic Solaris Check" 805, the available tests 712 for that test request are displayed. A user may then customize infrastructure testing by selecting computers (e.g., computers 714 and 716), test components (e.g., 717a-e), and tests (e.g., 718a-c). As such, a user can configure and execute tests, review and compare test results, for disparate computers and their software using a single user interface and associated controller and agents.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A computer-implemented method executed by a hardware processor connected to a networked database through a network interface at a second computer for testing a first computer configured to execute an application, the method comprising:

displaying, by a controller executed by the hardware processor and connected over a network interface to a user interface of the second computer, a plurality of tests available for execution by an agent of the first computer, the agent executing on the first computer;

enabling, by the second computer, user selection of a first test from among the plurality of tests;

after selection of the first test, enabling by the second computer user input of a parameter and an expected result from performing the first test, wherein the expected result is based on at least prior infrastructure testing to determine whether a problem being encountered by a particular application is caused by an infrastructure component, and wherein the prior infrastructure testing is performed independent of the application;

displaying, by the controller at the user interface of the second computer, a result of execution of the selected first test by the agent on the first computer, the agent executing the selected first test prior to and independent of executing the application, wherein:

the first test is configured to test a database access capability of the first computer, and displaying the plurality of tests available for execution by an agent of the first computer is based on the agent of the first computer querying test components on the first computer corresponding to the plurality of tests to determine availability of the test components.

2. The computer-implemented method of claim 1, further comprising:

sending, by the second computer, a test request for performing the selected first test to the controller.

3. The computer-implemented method of claim 2, wherein sending the test request to the controller comprises:
receiving, at the controller, a call from the user interface of the second computer, the call including the test request configured as an object.

4. The computer-implemented method of claim 3, wherein displaying, at the second computer, a result of execution of the selected first test includes receiving, from the controller, the result of execution of the selected first test by the agent on the first computer.

5. The computer-implemented method of claim 1, wherein the first test is configured to test a security of one or more network connections of the first computer.

6. A system for testing a first computer configured to execute an application, the system comprising:
a hardware processor in a second computer connected to a networked database through a network interface; and
a memory device coupled to the hardware processor and storing instructions which are executed by the hardware processor to:
display, by a controller executed by the hardware processor and connected over a network interface to a user interface of the second computer, a plurality of tests available for execution by an agent of the first computer, the agent executing on the first computer;
enable, at the second computer, user selection of a first test from among the plurality of tests;
after selection of the first test, enable, at the second computer, user input of a parameter and an expected result from performing the first test, wherein the expected result is based on at least prior infrastructure testing to determine whether a problem being encountered by a particular application is being caused by an infrastructure component, and wherein the prior infrastructure testing is performed independent of the application;
display, the controller at the user interface of the second computer, a result of execution of the selected first test by the agent on the first computer, the agent executing the selected first test prior to and independent of executing the application,
wherein:
the first test is configured to test a database access capability of the first computer, and
displaying the plurality of tests available for execution by an agent of the first computer is based on the agent of the first computer querying test components on the first computer corresponding to the plurality of tests to determine availability of the test components.

7. The system of claim 6, wherein the instructions are further executed by the hardware processor to:
send a test request for performing the selected first test to the controller.

8. The system of claim 7, wherein sending the test request to the controller comprises:
receiving, at the controller, a call from the user interface of the second computer, the call including the test request configured as an object.

9. The system of claim 8, wherein displaying, at the second computer, a result of execution of the selected first test includes receiving, from the controller, the result of execution of the selected first test by the agent on the first computer.

10. The system of claim 6, wherein the first test is configured to test a security of one or more network connections of the first computer.

11. A non-transitory computer-readable storage medium storing instructions that, when executed by a hardware processor in a second computer connected to a networked database through a network interface, enable the second computer to execute a method for testing a first computer configured to execute an application, the method comprising:
displaying, by a controller executed by the hardware processor and connected over a network interface to a user interface of the second computer, a plurality of tests available for execution by an agent of the first computer, the agent executing on the first computer;
enabling, by the second computer, user selection of a first test from among the plurality of tests;
after selection of the first test, enabling by the second computer user input of a parameter and an expected result from performing the first test, wherein the expected result is based on at least prior infrastructure testing to determine whether a problem being encountered by a particular application is being caused by an infrastructure component, and wherein the prior infrastructure testing is performed independent of the application;
displaying, by the controller at the user interface of the second computer, a result of execution of the selected first test by the agent on the first computer, the agent executing the selected first test prior to and independent of executing the application,
wherein:
the first test is configured to test a database access capability of the first computer, and
displaying the plurality of tests available for execution by an agent of the first computer is based on the agent of the first computer querying test components on the first computer corresponding to the plurality of tests to determine availability of the test components.

12. The non-transitory computer-readable storage medium of claim 11, wherein the method further comprises:
sending, by the second computer, a test request for performing the selected first test to the controller.

13. The non-transitory computer-readable storage medium of claim 12, wherein sending the test request to the controller comprises:
receiving, at the controller, a call from the user interface of the second computer, the call including the test request configured as an object.

14. The non-transitory computer-readable storage medium of claim 13, wherein displaying, at the second computer, a result of execution of the selected first test includes receiving, from the controller, the result of execution of the selected first test by the agent on the first computer.

15. The non-transitory computer-readable storage medium of claim 11, wherein displaying the plurality of tests available for execution by an agent of the first computer is based on the agent of the first computer querying test components on the first computer corresponding to the plurality of tests to determine availability of the test components.

* * * * *